(12) United States Patent
Deffontaines et al.

(10) Patent No.: US 9,152,906 B2
(45) Date of Patent: Oct. 6, 2015

(54) CONTACTLESS ELECTRONIC COMMUNICATION DEVICE WITH OPTIONAL AUXILIARY POWER SOURCE

(71) Applicant: Gemalto SA, Meudon (FR)

(72) Inventors: Theirry Deffontaines, Roquefort la Bedoule (FR); Philippe Rincel, Puy Ricard (FR); Nathalie Caye, Lille (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 14/483,286

(22) Filed: Sep. 11, 2014

(65) Prior Publication Data

US 2014/0374493 A1    Dec. 25, 2014

Related U.S. Application Data

(63) Continuation of application No. 14/289,346, filed on May 28, 2014, which is a continuation of application No. 11/082,429, filed on Mar. 17, 2005, now abandoned, which is a continuation of application No. 09/857,754, filed as application No. PCT/FR99/03032 on Dec. 7, 1999, now abandoned.

(30) Foreign Application Priority Data

Dec. 9, 1998    (FR) ................................. 98 15543

(51) Int. Cl.
     *G06K 19/06*         (2006.01)
     *G06K 17/00*         (2006.01)
     *G06K 19/07*         (2006.01)
                 (Continued)

(52) U.S. Cl.
     CPC ........ *G06K 19/0709* (2013.01); *G06K 19/0723* (2013.01); *G06K 19/0727* (2013.01); *G06K 19/0775* (2013.01); *G06K 19/07754* (2013.01); *G06K 19/07762* (2013.01); *H02J 5/005* (2013.01); *H02M 7/04* (2013.01);
(Continued)

(58) Field of Classification Search
CPC ..................................................... G06K 19/06
USPC ............... 340/10.1–10.5; 235/492, 451, 449; 380/24, 23, 25
See application file for complete search history.

(56) References Cited

U.S. PATENT DOCUMENTS

| | | |
|---|---|---|
| 4,795,898 A | 1/1989 | Bernstein et al. |
| 4,798,322 A | 1/1989 | Bernstein et al. |

(Continued)

FOREIGN PATENT DOCUMENTS

| | | |
|---|---|---|
| EP | 0875851 A2 | 11/1998 |
| GB | 2292866 A | 3/1996 |

*Primary Examiner* — Nam V Nguyen
(74) *Attorney, Agent, or Firm* — Buchanan Ingersoll & Rooney PC

(57) ABSTRACT

A device having a card (40) and a support (PC). The card has (a) no internal battery, (b) a single antenna (10) that receives electromagnetically data and power, (c) a data processor, (d) rectifying and filtering circuitry receiving the electromagnetic input and supplying at output terminals (A, B) a voltage to the processor. and (e) two terminals (36, 38) on an external surface of the card which are connected to the output terminals (A, B). The support is mechanically and electrically connectable to the card. It has (a) a power source that may be a battery, (b) surface terminals that mate with the card's external terminals, (c) a switch for connecting the power source to the surface terminals, and (d) a mechanism for holding together the card and support with the card's and the support terminal's electrically engaged to one another.

18 Claims, 5 Drawing Sheets

Figure 1:
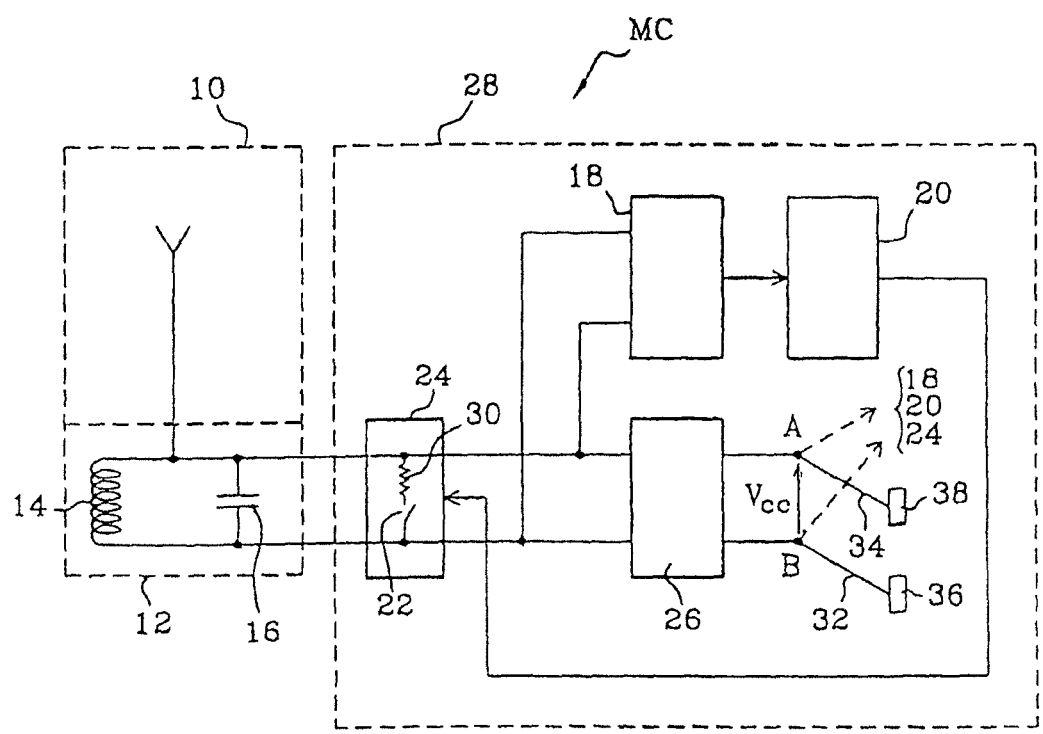

(51) Int. Cl.
  *G06K 19/077* (2006.01)
  *H04B 5/00* (2006.01)
  *H02J 5/00* (2006.01)
  *H02M 7/04* (2006.01)

(52) U.S. Cl.
  CPC .............. *H04B 5/00* (2013.01); *H04B 5/0056* (2013.01); *H04B 5/0081* (2013.01)

(56) References Cited

U.S. PATENT DOCUMENTS

| | | |
|---|---|---|
| 4,835,373 A | 5/1989 | Adams et al. |
| 5,418,353 A | 5/1995 | Katayama et al. |
| 5,430,441 A | 7/1995 | Bickley et al. |
| 5,448,110 A | 9/1995 | Tuttle et al. |
| 5,465,401 A | 11/1995 | Thompson |
| 5,473,145 A | 12/1995 | Wallerstorfer et al. |
| 5,642,095 A | 6/1997 | Cook |
| 5,642,102 A | 6/1997 | Panther et al. |
| 5,698,838 A * | 12/1997 | Yamaguchi .................. 235/492 |
| 5,729,000 A | 3/1998 | Sugimoto |
| 5,736,729 A | 4/1998 | Seppanen |
| 5,748,737 A | 5/1998 | Daggar |
| 5,787,174 A | 7/1998 | Tuttle |
| 5,847,447 A | 12/1998 | Rozin et al. |
| 5,889,273 A * | 3/1999 | Goto ........................... 235/492 |
| 5,949,823 A * | 9/1999 | Suga et al. .................. 375/256 |
| 6,016,954 A | 1/2000 | Abe et al. |
| 6,128,604 A | 10/2000 | Sakamaki et al. |
| 6,173,899 B1 | 1/2001 | Rozin |
| 6,202,927 B1 | 3/2001 | Bashan et al. |
| 6,323,566 B1 * | 11/2001 | Meier ......................... 307/10.2 |
| 6,367,701 B1 * | 4/2002 | Fries ........................... 235/486 |
| 6,477,043 B2 * | 11/2002 | McKnight ................ 361/679.33 |
| 6,489,883 B1 * | 12/2002 | Iiyama et al. ................. 340/5.1 |

* cited by examiner

CONTACTLESS ELECTRONIC COMMUNICATION DEVICE WITH OPTIONAL AUXILIARY POWER SOURCE

This is a continuation of application Ser. No. 14/289,346, filed May 28, 2014, now abandoned, which is a continuation of application Ser. No. 11/082,429, filed Mar. 17, 2005, now abandoned, which is a continuation of application Ser. No. 9/857,754, filed Jun. 22, 2001, now abandoned, which is a national stage filing of PCT/FR99/03032, filed Dec. 7, 1999, and claims priority to French Application No. 98/15543, filed Dec. 9, 1998.

The invention relates to contactless electronic communication systems in which at least one electronic communication device without an internal electric power source carried by a user communicates, by means of electromagnetic signals, with an electronic interrogation/reading/writing device.

Such contactless electronic communication systems are used, for example, for controlling access to ski runs, premises, garages, public transportation, etc, since the absence of any contact increases the speed of passage of the users whilst allowing exchange of information between the electronic device carried and the interrogation/reading/writing device so as to manage access according to certain criteria.

The electronic interrogation/reading/writing device emits electromagnetic signals, for example at radio frequency, which are detected by the electronic communication device carried by the user and serve on the one hand as a transmission medium for the information to be exchanged and on the other hand as an energy source for the electrical power supply to the electronic communication device. To this end, the latter comprises, for example, as shown in the simplified diagram in FIG. 1, an antenna 10 consisting of a resonant circuit 12 comprising a coil 14 and a capacitor 16. The radio frequency signals received by the antenna 10 coming from the interrogation/reading/writing device are applied to a demodulator 18 which detects the low-frequency modulation signals containing the binary information transmitted by the interrogation/reading/writing device.

These binary information signals are processed by a digital processing circuit 20 in order to interpret them and if necessary produce a response in the form of binary signals which are transmitted to the interrogation/reading/writing device via a modulator 24 represented by a switch 22 and a load impedance (30) connected to the terminals of the resonant circuit 12.

The radio frequency signals detected by the antenna 10 are also applied to a rectifying and filtering circuit 26 which supplies, at the terminals A and B, a supply voltage $V_{cc}$ to the circuits 18, 20 and 24.

The contactless electronic communication device according to the diagram in FIG. 1 is produced in the form of a microcircuit 28 disposed in a plastic card, of the bank card type, the coil 14 of the antenna being disposed along the periphery of the card, the whole constituting a communication module MC.

It should be noted that the capacitor 16 is produced partly in the microcircuit 28 and partly outside it with a view to the tuning adjustment of the resonant circuit 12.

Such a microcircuit can also be disposed in the case of a watch, the material of the case being designed to allow passage of the electromagnetic signals to the antenna inside the case.

Such contactless electronic communication systems have the major drawback that their operating distance is limited, for example a few tens of centimeters at the frequency of 13.56 MHz in read/write mode, because of the inadequacy of the electrical supply power which is actually available for the microcircuit, beyond a certain distance between the interrogation/reading/writing device and the antenna.

In addition, this inadequacy of the electrical supply power limits the speed and therefore the calculation power of the microcircuit, which does not make it possible to implement complex transactions requiring major data processing and/or cryptographic calculations for the purpose of security in a short interval of time.

Moreover, it is not possible to increase the radiation energy of the interrogation/reading/writing devices since their power is limited so as not to interfere with adjacent installations and the environment in general, in accordance with current regulations.

The purpose of the invention is therefore to produce a contactless electronic communication device which has a maximum operating distance and a calculation power which are greater than those of the devices of the prior art.

This aim is achieved by modifying the contactless electronic communication device so that it can be connected to an electrical power source of a normal object, such as an electric battery, disposed on a support such as a card holder or a watch.

The invention therefore relates to a contactless electronic electromagnetic communication device of the type comprising in a module:
  means of receiving electromagnetic signals,
  means of processing the electromagnetic signals received, and
  means of rectifying and filtering the electromagnetic signals received in order to supply, at two output terminals, a supply voltage to the processing means,
  characterised in that it also comprises
  means of supporting an electrical power source, and
  means of connecting the said electrical power source to the said output terminals of the rectifying and filtering circuit.

The connection means also comprise a switch for establishing or cutting off the connection between the power source and the terminals of the rectifying and filtering circuit.

The connection means comprise:
  in the module, conductors for connecting the output terminals of the rectifying and filtering circuit to first contact terminals,
  in the support means, conductors for connecting the electrical power source to second contact terminals, and
  means for connecting together the said first and second contact terminals.

When the module is carried by a card of the bank type
  the means of supporting the electrical power source comprise a card holder, and
  the means of connecting the said first and second contact terminals comprise means of guiding and holding the card in the card holder so as to make the said first and second contact terminals coincide.

When the module is disposed in a case
  the means of supporting the electrical power source comprise an object such as a watch with an electric battery,
  the first contact terminals comprise a connector disposed on the case of the module,
  the second contact terminals comprise a connector disposed on the watch case, and
  the said connectors cooperate with each other in order to establish electrical connections and being held in this position by holding means carried by the case of the module and the object supporting the electrical power source.

The connectors can be studs which are situated opposite each other or connectors of the male/female type.

Where the supporting object is a portable mobile telephone, the battery charging terminals are used for establishing the connection between the battery and the module.

Figure 2A:
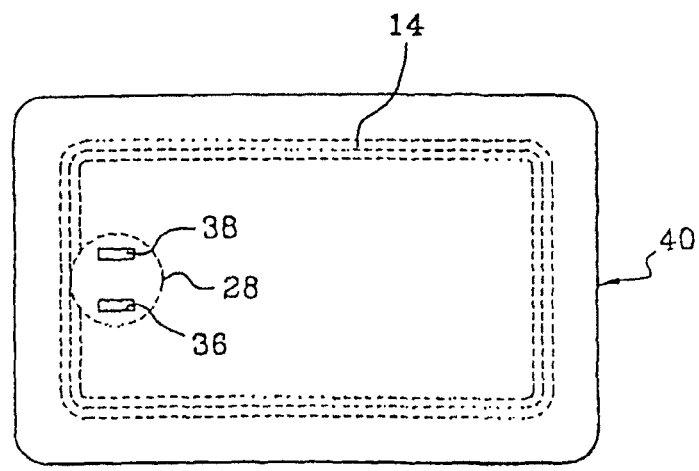
Figure 2B:
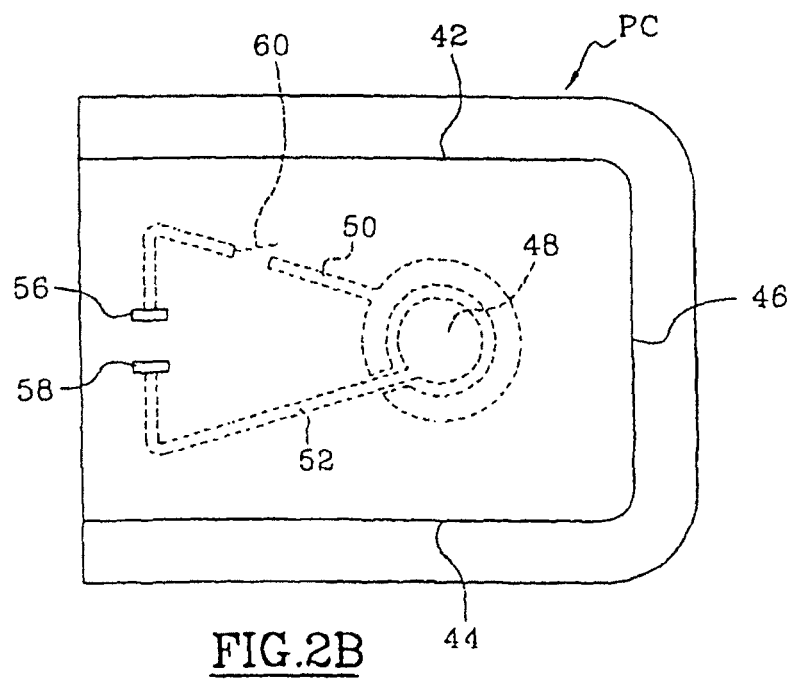
Figure 4:
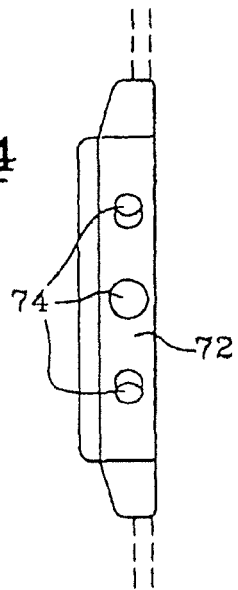
Figure 3:
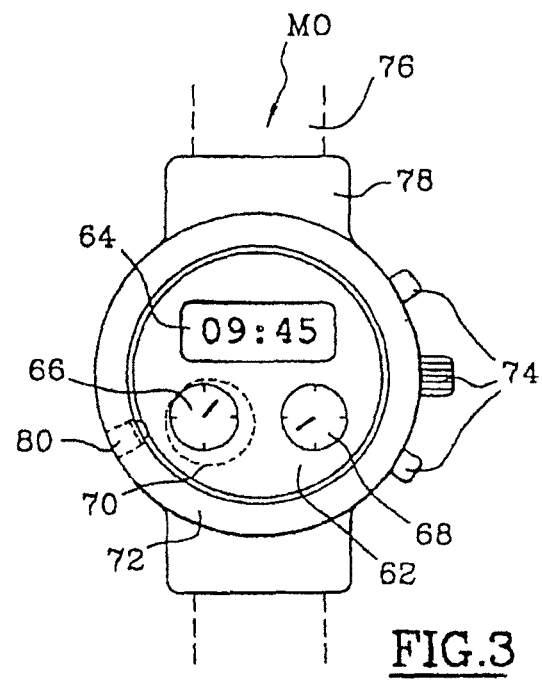
Figure 6:
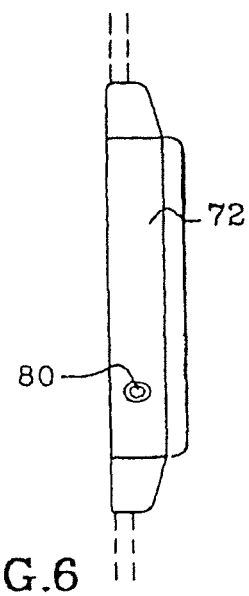
Figure 5:
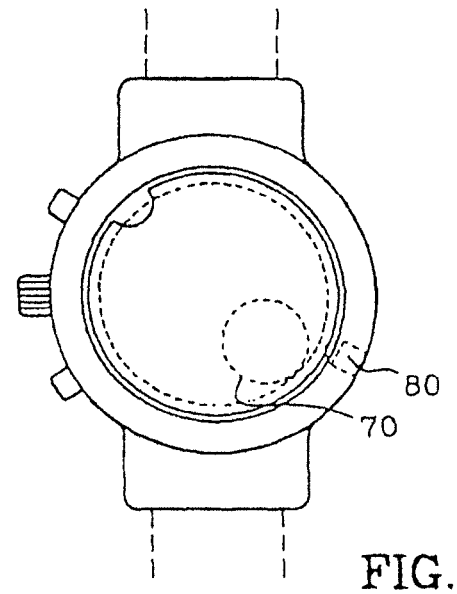
Figure 7:
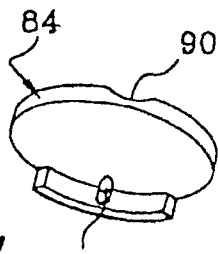
Figure 8:
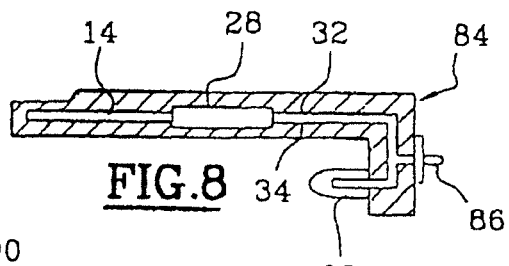
Figure 9:
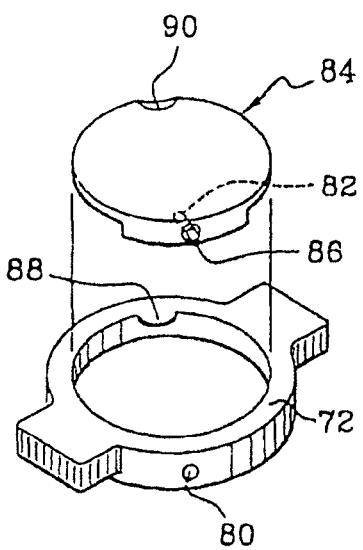
Figure 10:
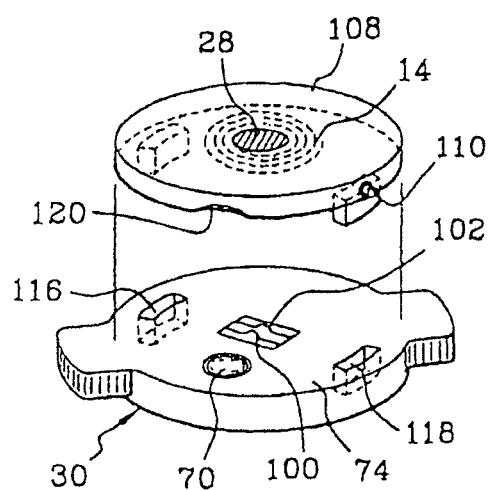
Figure 11:
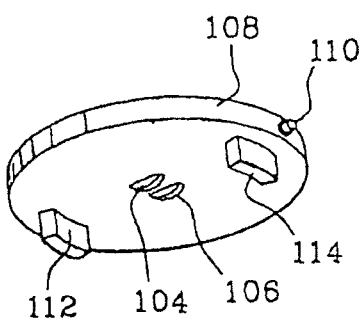
Figure 12:
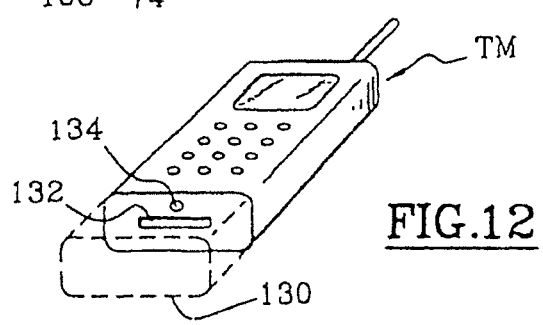
Figure 13:
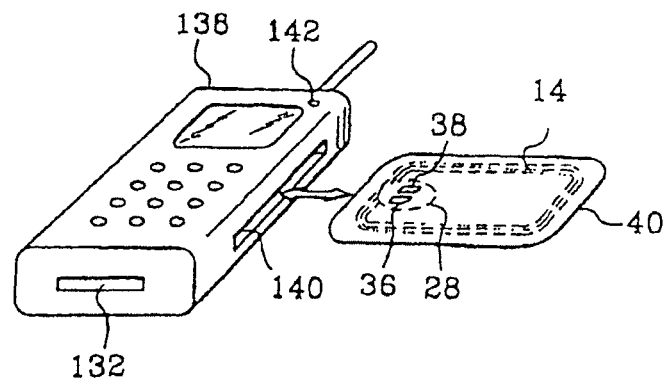

Other characteristics and advantages of the invention will emerge with the description of some of its embodiments, this being given with reference to the accompanying drawings, in which:

FIG. 1 is a functional electronic diagram of an electronic communication device having characteristics of the invention, FIGS. 2A and 2B show a microcircuit card implementing a contactless electronic communication device and a card holder according to the invention, the latter being able to receive the card of FIG. 2A, FIG. 3 is a plan view of a watch containing an electric battery, FIG. 4 is a right-hand view of the watch of FIG. 3, FIG. 5 is a view from below of the watch of FIG. 3, FIG. 6 is a left-hand view of the watch of FIG. 3, FIG. 7 is a perspective view of a case containing a contactless communication module and designed to adapt to a watch containing an electric battery, FIG. 8 is a view in section of the case of FIG. 7, FIG. 9 is a view in exploded perspective of the case of FIG. 7 and of the case of the watch containing the electric battery, FIG. 10 is a view in exploded perspective of a variant combination between a case containing a communication module and a watch containing an electric battery, FIG. 11 is a view in perspective from below of the case of FIG. 10, FIG. 12 is a view in perspective of a case containing a contactless communication module associated with a mobile telephone handset according to the invention, and FIG. 13 is a view in perspective of a portable mobile telephone handset associated with a microcircuit card according to FIG. 2A.

The diagram in FIG. 1 of a contactless electronic device will not be described again for the elements known from the prior art.

To implement the invention, it must be modified in order to connect, via conductors 32, 34, the output terminals A and B of the rectifying and filtering circuit 26 with two contact terminals 36 and 38 disposed outside the module MC containing the microcircuit 28 and the resonant circuit antenna 10.

The so-called contactless communication module MC is normally housed in the thickness of a plastic card 40, the coil 14 of the antenna 10 being housed at the periphery of the card in one or more turns. According to the invention, the contact terminals 36 and 38 are disposed on the surface of the card 40.

The card 40 cooperates with a card holder PC so as to be inserted, by sliding for example, in raised grooves 42 and 44 with a stop 46. The card holder serves as a support for an electric battery 48 housed in the thickness of the card holder. The electrical terminals of the battery 48 are connected by conductors 50 and 52 housed in the thickness of the card holder, to contact terminals 56 and 58 disposed at the surface of the card holder so as to cooperate respectively with the contact terminals 36 and 38 of the card 40, it being understood that the card 40 in FIG. 2A must be turned over in order to be inserted in the grooves 42 and 44.

The electrical connection between the electric battery 48 and the contact terminals 56 and 58 may be permanent or intermittent as required by the user provided that a switch 60 is connected in series, on the conductor 50 for example, which is handled by the user.

By means of this combination of the card 40 with the card holder PC, the microcircuit 28 is supplied with the voltage of the electrical battery 48, which can replace or possibly be added to the voltage supplied by the rectifying and filtering circuit 26. The result is a supply voltage $V_{cc}$ which is constant since it is independent of the distance between the card 40 and the interrogation/reading/writing device, giving rise to a greater maximum detection distance, a longer period available for processing and a higher calculation speed.

There exist microcircuit cards known as "combicards" which are designed on the one hand to communicate with an interrogation/reading/writing device at a distance but also on the other hand to communicate with an interrogation/reading/writing device with contacts. For this purpose, these combicards have a microcircuit 28 connected to contact terminals of the conventional type, for example according to ISO 7816-2.

These combicards can be used in the context of the invention with the card holder PC provided that the contact terminals 56 and 58 have an arrangement in accordance with the aforementioned standard.

In general terms, the contact terminals 36 and 38 of the contactless card 40 and those 56, 58 of the card holder PC will comply with the standard, which ipso facto will allow the use of combicards by the card holder PC.

The switch 60 can be of the push button microswitch type housed in the thickness of the card holder, the push button being for example disposed on the face of the card holder opposite to the one receiving the card 40.

The electrical battery 48 is of the extra-flat type and is housed in a cavity in the card holder PC with a view to its possible replacement.

Naturally, the microswitch and its push button can be housed in the cavity of the extra-flat battery.

In the example embodiment of the invention according to FIGS. 2A and 2B, the contactless electronic module MC is carried by a plastic card 40 of the bank card type whilst the electrical battery 48 is carried by a card holder PC on which the card 40 is inserted so as to establish electrical contacts between the terminals 36, 38, 56 and 58.

The invention also applies to any contactless electronic module as modified in order to have contact terminals 36 and 38 so as to be connected to contact terminals of a battery carried by an object such as an electronic watch or a mobile telephone handset.

The object carrying the battery must be modified in order to have contact terminals equivalent to the terminals 56 and 58 of the card holder PC and the same applies to the contact terminals 36 and 38 of the modules in order to adapt to the terminals 56 and 58 of the object carrying the electrical battery. FIGS. 4 to 11 show two examples of combination between a contactless electronic module and a watch with electrical battery whilst FIGS. 12 and 13 show two examples of combinations between a contactless electronic module and a mobile telephone.

A watch MO (FIGS. 3 to 11) of the electronic type comprises an electronic circuit (not shown), a display device (62) with one or more dials 64, 66, 68 and an electrical supply battery 70, these three components being disposed in a case 72 provided on its periphery with various control buttons 74. The case 72 is held on the wrist by a bracelet 76 via connection articulations 78.

According to the invention, the electrical battery 70 is connected not only to the electronic circuit and to the dials but also to a connector 80 (FIGS. 3 to 9), of the female type for example, which is carried by the lateral part of the watch case 72. This connector 80 cooperates with a male connector 82 carried by a case 84 containing the microcircuit 28, the antenna coil 14 and the electrical conductors 32 and 34. A microswitch 86 is connected in series to the conductor 32 so as to supply or not the microcircuit 28 at the request of the user.

The case 84 is fixed to the back of the watch by snapping on the male 82 and female 80 connectors and by means of a lug 88 under which a thinned part 90 of the case 84 fits.

Instead of being disposed on the lateral face of the watch, the output connector of the electrical battery 70 can be disposed on the back of the watch case in the form of two contacts 100 and 102 (FIGS. 10 and 11) which cooperate respectively with two studs 104 and 106 on a case 108 containing the electronic microcircuit 28, the antenna coil 14 and the electrical conductors 32 and 34.

The studs 104 and 106 are connected to the points A and B of the electronic microcircuit 28 by the electrical conductors 32 and 34, one of which is provided with a microswitch 110 actuated by the user.

The case 108 is fixed to the back of the watch by two brackets 112, 114 which cooperate respectively with two housings 116 and 118 disposed in the back of the watch. The case 108 has a thinned peripheral part 120 for release.

When the electrical battery is on a mobile telephone TM (FIG. 12), the electronic microcircuit 28 and its antenna are, for example, disposed in a parallelepipedal case 130 having on one face two male contacts, not shown. These two contacts are inserted in female contacts 132 on the mobile telephone, those used for recharging the telephone battery. A microswitch 134 is disposed on an electrical conductor 32 or 34 and is actuated by the user by means of a push button carried by the case 130.

Some mobile telephones 138 (FIG. 13) are equipped with a connector 140 (FIG. 13) in which a card of the bank type can be inserted with a view to adding additional functions to the mobile telephone. In this case, the contactless card 40 of FIG. 2A can be inserted in the connector 140 so as to connect its contacts 36 and 38 to the electrical supply contacts of the connector 140. The switch 142 is disposed on the mobile telephone 138.

It should be noted that the switch 60 or 142 is carried by the card holder PC or the mobile telephone 138, which contains the electrical power source, whilst the switch 86 or 134 is carried by the case 84 or 130, which contains the microcircuit 28.

It should be noted that the electrical power source can be a rechargeable battery, an electrical battery, removable or not, or so-called solar cells, for example of the photovoltaic type.

What is claimed is:

1. A combination, comprising:
   an electronic module that wirelessly communicates with a reader, said module being embodied in a carrier having an antenna that receives electromagnetic signals from the reader, said electronic module including:
     a processor that processes electromagnetic signals received by the antenna, and
     a rectifying and filtering circuit that converts electromagnetic signals received by the antenna into a supply voltage that is supplied to said processor via a pair of output terminals;
   said carrier having a pair of contacts on an exterior surface thereof that are electrically connected to said pair of output terminals, respectively; and
   a holder to which said carrier is physically connectable, said holder being separate from a reader with which the electronic module communicates, and including:
     a compartment for a source of electrical power,
     a pair of terminals that connect with the pair of contacts on the exterior surface of the carrier when the carrier is connected to the holder, and
     a pair of conductors that connect said terminals with a source of power disposed within said compartment.
2. The combination of claim 1, wherein said carrier is a card, and the holder is a card holder.
3. The combination of claim 1, wherein said holder is a watch.
4. The combination of claim 1, wherein said carrier is a card, and the holder is a mobile telephone.
5. The combination of claim 1, wherein the source of electrical power is a removable battery.
6. The combination of claim 1, further including a manual switch for disconnecting the electrical power source from at least one of the output terminals of the electronic module.
7. The combination of claim 6, wherein the manual switch is disposed on the holder.
8. The combination of claim 6, wherein the manual switch is disposed on the carrier.
9. A method, comprising:
   connecting a carrier having (a) an antenna that receives electromagnetic signals, (b) an electronic module that includes (i) a processor that processes electromagnetic signals received by the antenna, and (ii) a rectifying and filtering circuit that receives the electromagnetic signals from the antenna at a pair of input terminals and converts the electromagnetic signals into a supply voltage that is supplied to said processor via a pair of output terminals, and (c) a pair of contacts on an exterior surface thereof that are electrically connected to said pair of output terminals, to
   a holder that includes (a) a source of electrical power, (b) a pair of terminals that connect with the pair of contacts on the exterior surface of the carrier, and (c) a pair of conductors that connect said terminals with the source of power,
   to thereby provide power to the electronic module for wireless communication with a reader.
10. The method of claim 9, wherein said carrier is a card, and the holder is a card holder.
11. The method of claim 9, wherein said holder is a watch.
12. The method of claim 9, wherein said carrier is a card, and the holder is a mobile telephone.
13. The method of claim 9, wherein the source of electrical power is a removable battery.
14. A method, comprising:
   using a carrier having (a) an antenna that receives electromagnetic signals, (b) an electronic module that includes (i) a processor that processes electromagnetic signals received by the antenna, and (ii) a rectifying and filtering circuit that receives the electromagnetic signals from the antenna at a pair of input terminals and converts the electromagnetic signals into a supply voltage that is supplied to said processor via a pair of output terminals, and (c) a pair of contacts on an exterior surface thereof that are electrically connected to said pair of output terminals, and that is connected to
   a holder that includes (a) a source of electrical power, (b) a pair of terminals that connect with the pair of contacts on the exterior surface of the carrier, and (c) a pair of conductors that connect said terminals with the source of power,
   to wirelessly communicate with a reader.
15. The method of claim 14, wherein said carrier is a card, and the holder is a card holder.
16. The method of claim 14, wherein said holder is a watch.
17. The method of claim 14, wherein said carrier is a card, and the holder is a mobile telephone.
18. The method of claim 14, wherein the source of electrical power is a removable battery.

* * * * *